July 31, 1923.
H. C. STRUCHEN
HOIST FOR VEHICLE BODIES
Filed July 12, 1920
1,463,637
2 Sheets-Sheet 1
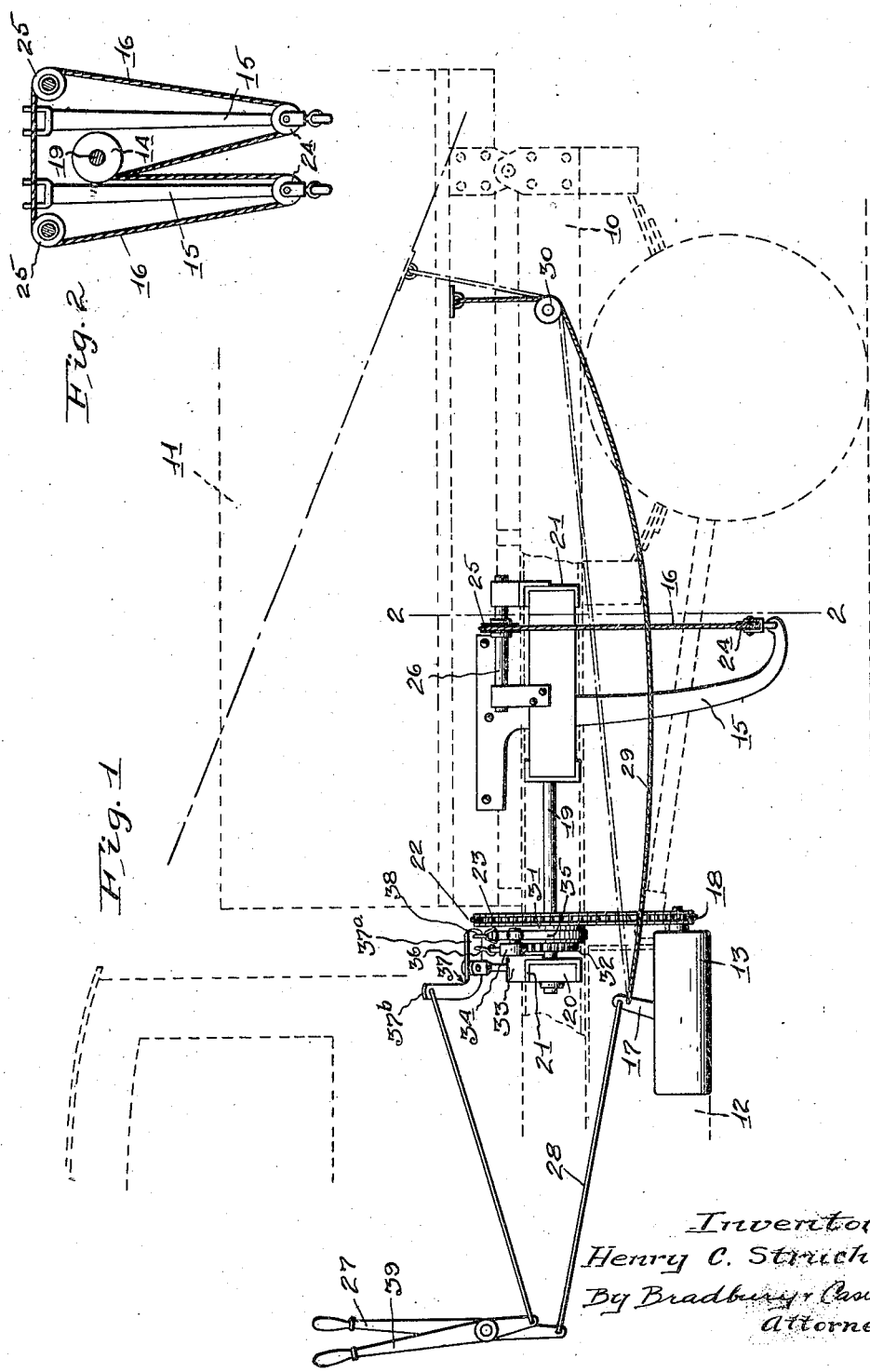
Inventor
Henry C. Struchen
By Bradbury & Caswell
Attorneys

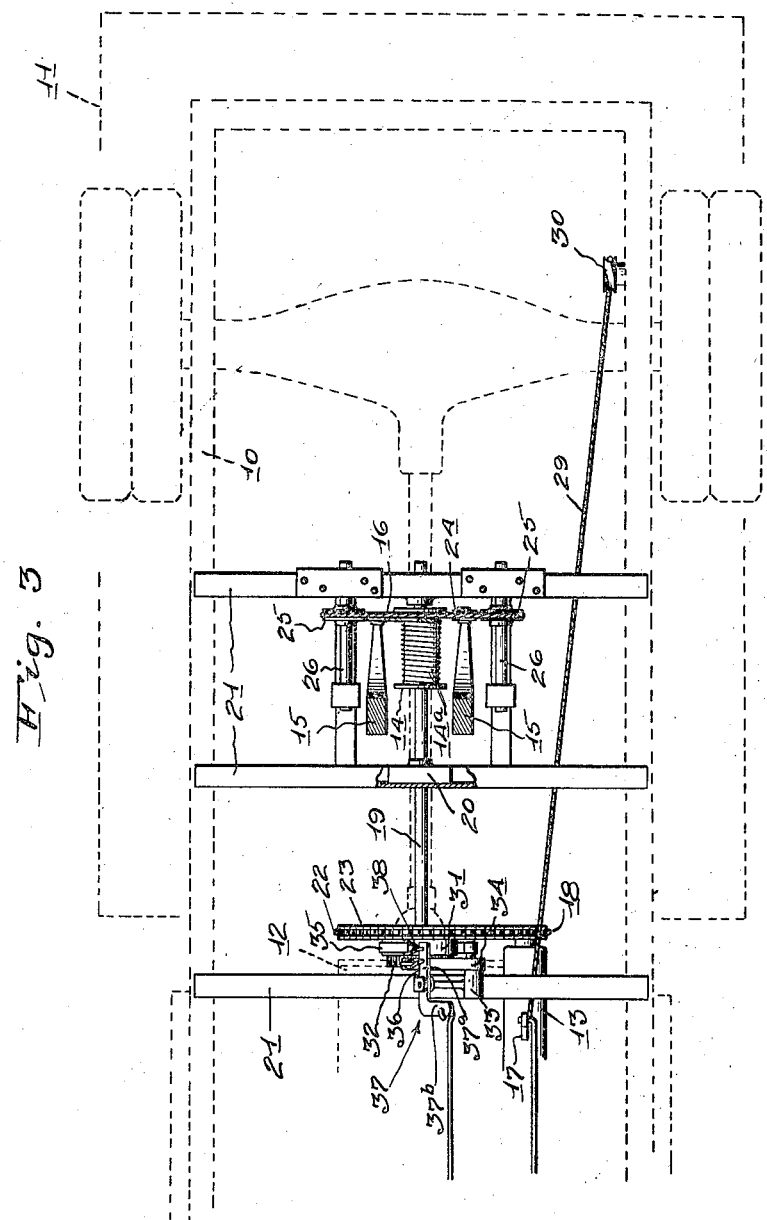

Patented July 31, 1923.

1,463,637

UNITED STATES PATENT OFFICE.

HENRY C. STRUCHEN, OF ST. PAUL, MINNESOTA.

HOIST FOR VEHICLE BODIES.

Application filed July 12, 1920. Serial No. 395,523.

*To all whom it may concern:*

Be it known that I, HENRY C. STRUCHEN, a citizen of the United States, residing at St. Paul, in the county of Ramsey and State of Minnesota, have invented a new and useful Hoist for Vehicle Bodies, of which the following is a specification.

My invention relates to improvement in hoists for vehicle bodies.

Its object is to provide a simple, durable, efficient and inexpensive attachment adapted to be applied to a self propelled vehicle, having a dump body tiltably supported upon the chassis thereof, and designed to transmit power from the propelling mechanism of the vehicle to said body for lifting the same.

A further object is to provide, in a device of this kind, means for automatically locking the body in any of its various elevated positions and means for manually releasing the body and regulating the speed of its fall to normal position.

A further object is to supply, an attachment of this nature having a safety device for automatically disconnecting the driving mechanism from the propelling mechanism of the vehicle, when the body reaches a predetermined position in dumping.

With the foregoing and other objects in view, which will appear in the following description, the invention resides in the novel combination and arrangement of parts and in the details of construction hereinafter described and claimed.

In the drawings, Fig. 1 includes a side view of a truck in dotted lines and a solid line representation of a device embodying my invention and applied to said truck; Fig. 2 is a detail sectional view taken on the line 2—2 of Fig. 1 and Fig. 3 is a plan view of the structure illustrated in Fig. 1.

Reference being had to the drawings, it will be seen that I have illustrated a conventional truck including a frame 10, a longitudinally tiltable dump body 11, pivotally mounted at the rear thereof on said frame, and a transmission case 12.

My improved hoist comprises an attachment for such vehicles and includes a take-off device 13, a winding drum 14, on the frame 10, arms 15 depending from the body 11 and a lifting cable 16 attached to said drum and connected with said arms. The take-off device 13 is of conventional design having an actuating arm 17 and a driving sprocket 18, said device being applied in the ordinary manner to the transmission case 12 of a vehicle. The drum 14 is fixed on a shaft 19 revoluble in journals 20 on beams 21 supported on the frame of the vehicle. A large sprocket wheel 22, fixed to the shaft 19, receives a sprocket chain 23 passing over the small sprocket wheel 18 of the take-off mechanism. The arms 15 depend from the body 11 upon opposite sides of the drum 14, swiveled pulleys 24 being attached at the lower ends thereof. A pair of idler pulleys 25 are slidably mounted upon shafts 26 above the drum 14 and parallel with the drum shaft 19. The lifting cable 16 passes over the idler pulleys 25 and under the swiveled pulleys 24, as seen in Fig. 2, the extremities of said cable being secured to the drum 14 at the rear end thereof. The employment of the pulleys 24, increases the force transmitted from the winding drum 14 to the lifting arms 15, thus requiring less power in raising the body than would otherwise be necessary were the arms connected directly with the drum. A double spiral groove $14^a$ on the periphery of the drum 14 is designed to receive the two reaches of the cable, as the same are carried forward by the arms 15, in lifting the body. By employing a single cable and mounting the same upon the idlers 25, I provide for automatic compensation in the cable and avoid differences in tension between the reaches thereof. Said slidable idler pulleys 25 provides self-adjustable supports for the cable, which rest, at all times, directly above the pulleys 24, thus avoiding various angular pulls upon said pulleys.

A hand lever 27, connected through a rod 28 with the actuating arm 17 of the take-off device 13, provides for manually throwing the take-off mechanism into gear with the propelling mechanism of the vehicle. A tripping cable 29 attached at one end to the arm 17 and at its other end to the body 11, passes under a sheave 30 on the frame 10. The movement of the body, when raised, pulls upon the cable 29 and results in throwing the take-off mechanism out of gear at a predetermined elevation of the body 11.

To provide for holding the body in its various elevated positions and to regulate the lowering of said body, I supply a brake drum 31 and a ratchet wheel 32, both being fixed upon the shaft 19. A bracket 33, mounted on a beam 21 adjacent to said brake drum and ratchet wheel, pivotally supports a pawl 34 and carries one end of a brake band 35. The pawl 34 rests upon the ratchet wheel 32 and is connected near its free end with a link 36, which is attached to said arm 37ª of a bell-crank 37 pivoted on said bracket. The free end of the brake-band 35 is also connected with said arm 37ª through a link 38. A hand-lever 39 connected with the arm 37ᵇ of the bell-crank 37 provides for simultaneously engaging the brake-band 35 with the brake drum 31 and disengaging the pawl 34 from the ratchet wheel 32, when said lever is pulled rearwardly, and provides for simultaneously re-engaging said pawl with said ratchet wheel and disengaging the brake-band from the brake drum, when said lever is thrust forward.

To dump the contents of the body 11, the lever 27 is pulled rearward to throw the take-off device 13 into gear with the transmission mechanism. The drum 14 is turned in a direction to wind in the cable and the forward end of the body 11 is lifted until the take-off mechanism is manually disconnected from the transmission mechanism, through the operation of said lever 27, or through the tripping cable 29. The pawl 34 automatically engages the ratchet wheel 32 and holds the drum 14 against counter-revolution, when the dumping movement of the body is arrested. As the body 11 is raised, the cable is directed into the spiral grooves 14ª, on the drum, by movement of the arms 15 and the idler pulleys 25 are slid forward by the advancing reaches of the cable. A rearward pull on the lever 39 releases the pawl 34 and grips the brake-band 35 about the brake-drum 31. The body 11 is lowered by gravity, the speed of its return depending upon the force exerted upon the lever 39. As the body 11 is lowered, the cable is unwound from the drum 14 and the idler pulleys 25 slide back to initial positions.

Changes in the specific form of my invention, as herein disclosed, may be made within the scope of what is claimed without departing from the spirit of my invention.

Having described my invention, what I claim as new and desire to protect by Letters Patent is:

1. The combination with a self-propelled vehicle having a dump body tiltably supported upon the frame thereof, of an arm depending from the body, a winding drum revoluble in the vehicle frame, the axis of said drum being at right angles with respect to the pivotal axis of said body, a lifting cable attached to said drum and connected with said arm, a power take-off device operatively connected with the propelling mechanism of the vehicle and power transmitting mechanism between said take-off device and drum for turning the latter to wind said cable thereon and tilt the body, said arm, during the winding operation, being swung upon movement of the body to feed the cable longitudinally of said drum.

2. The combination with a self-propelled vehicle having a dump body tiltably supported upon the frame thereof, of arms depending from the body, a pulley at the lower extremity of each arm, a winding drum revoluble in the vehicle frame, the axis of said drum being at right angles with respect to the pivotal axis of said body, idler pulleys slidable on the frame of the vehicle in parallelism with said drum and above the same, a lifting cable attached at its ends to said drum, each reach of said cable passing beneath the pulley on one of the arms and over one of said slidable idler pulleys, a power take-off device operatively connected with the propelling mechanism of the vehicle and power transmitting mechanism between said take-off device and drum for turning the latter to wind said cable thereon and tilt the body, said arms during the winding operation being swung by the movement of the body to feed the cables longitudinally of said drum.

In testimony whereof, I have signed my name to this specification.

HENRY C. STRUCHEN.